Feb. 19, 1952  C. A. NEWMAN ET AL  2,586,248
THERMO SAFETY VALVE
Filed Jan. 7, 1949
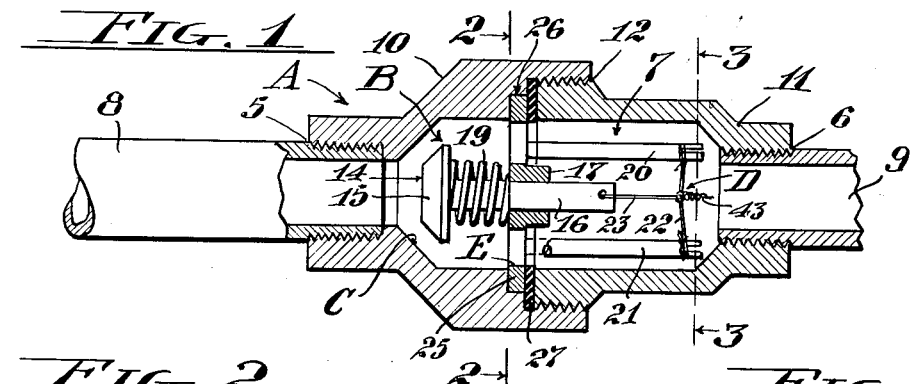
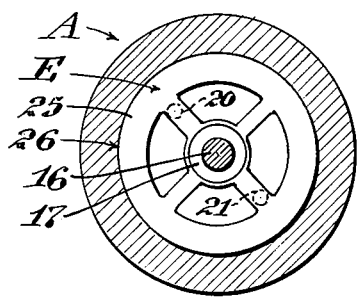
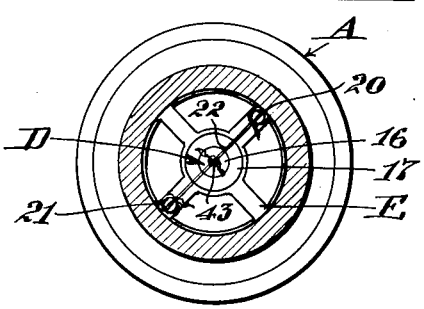
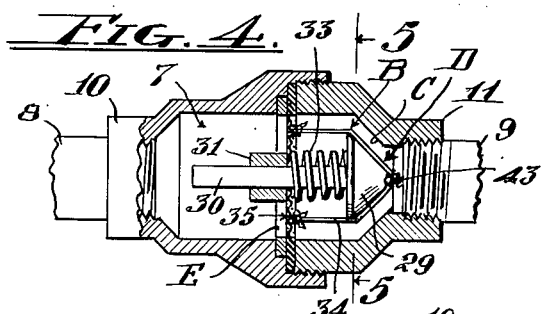
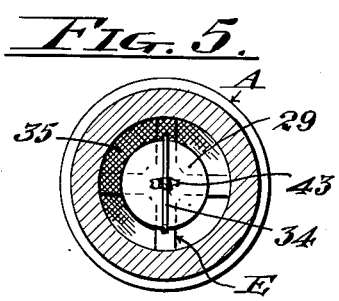
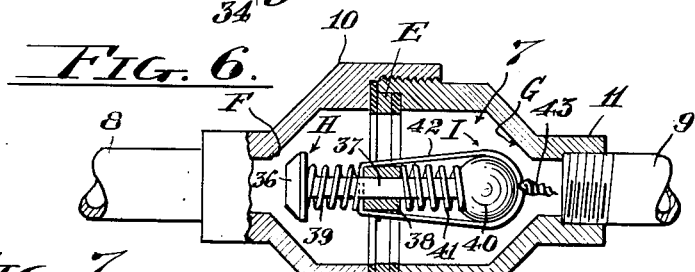
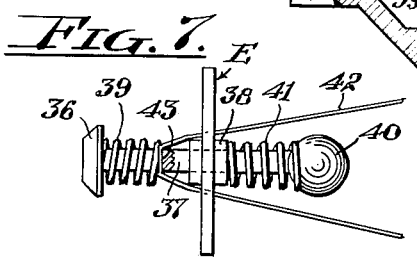
Inventors
Carl A. Newman and
Reni S. Berry;
By
Attorney Patented Feb. 19, 1952

2,586,248

UNITED STATES PATENT OFFICE 2,586,248

THERMO SAFETY VALVE

Carl A. Newman and Reni S. Berry,
Los Angeles, Calif.

Application January 7, 1949, Serial No. 69,678

3 Claims. (Cl. 137—162)

1

This invention relates to a valve and more particularly pertains to a temperature controlled valve for protecting fuel lines from the flare-back of flames generated at the discharge end of such lines.

The particular object of the invention is to provide a valve embodying a normally open spring urged valve element arranged in a chamber in the valve housing through which combustible fluid fuel is flowed from a fuel supply line to discharge, in which the valve element is held in its open position by a fusible element so formed and arranged that on being subjected to the flare-back of a flame will fuse and separate so as to release the valve element and permit actuation thereof in a manner to prevent the flame from reaching the fuel supply line.

Another object is to provide a safety valve of the above character which is especially applicable for use in conjunction with an acetylene welding torch to automatically cut off gas supply to the torch in event the flame at the torch nozzle should flare back into the torch, thereby preventing possible explosion due to such flare back igniting the gas in the supply line.

Another object is to provide a fuse controlled valve element in the form of a unit which can be readily mounted in and removed from a housing to facilitate replacement of a used unit.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a view in longitudinal section, partly in elevation of a valve showing one embodiment of the invention;

Fig. 2 is a sectional view taken on the line 2—2 of Fig. 1;

Fig. 3 is a view in cross section taken on the line 3—3 of Fig. 1;

Fig. 4 is a view in longitudinal section showing another embodiment of the invention;

Fig. 5 is a view in cross section as seen on the line 5—5 of Fig. 4;

Fig. 6 is a longitudinal sectional view of a valve depicting a further embodiment of the invention; and Fig. 7 is a view in elevation of the valve element unit shown in Fig. 6 showing it as detached and depicting the manner of effecting assemblage thereof.

Referring to the drawing more specifically A

2 indicates generally a valve housing which is provided with a fuel inlet 5 at one end thereof and a discharge outlet 6 at its opposite end with a passage 7 affording a communication between its inlet and outlet.

The inlet is adapted to be connected to a fuel supply line 8 while the outlet 6 is adapted to be connected to the entrant end 9 of a nozzle or burner, such as that of an acetylene torch or the like.

The valve housing A comprises two separable end portions 10 and 11 formed with interengaging internal and external threads as indicated at 12 whereby the end sections 10 and 11 may be screwed in and out of engagement with each other to give access to the interior of the valve housing. Arranged within the chamber 7 of the valve housing is a spring pressed fuse controlled valve element B arranged to cooperate with a valve seat C formed in the valve housing at an end of the chamber 7; the valve element B being normally disposed in its open position relative to the seat C by a controlling fusible element D arranged within the chamber 7 adjacent the outlet end thereof and in the path of flames flaring back through the entrant end 9 of a nozzle or burner. The valve element B and the fusible element D may be formed and mounted within the valve housing A in various fashions, but are preferably contrived to constitute a removable, replaceable and renewable unit adapted to be readily mounted within the valve housing and removed therefrom and such that the fusible element may be readily replaced to recondition the element in event of rupture or destruction of the fusible element.

In the form of the invention shown in Fig. 1 the valve element B embodies a valve head 14 having a beveled margin 15 arranged for positioning on the valve seat C; the valve head 14 being mounted on a reciprocal stem 16 extending through a sleeve 17 on a spider E carried by the valve housing. A spiral spring 19 wound around the stem 16 bears between the spider E and the valve head 14 and is tensioned to normally urge the valve head 14 toward the seat C. Mounted on the spider E and projecting from the side thereof opposite the valve head 14 are studs 20 and 21 the outer ends of which carry a fusible wire 22 arranged to extend diametrically across the inner end of the valve outlet 6 or the outer end of the passage 7. Fastened to the wire 22 is a fusible wire 23 attached to the outer end of the valve stem 16; the wire 23 being wrapped or twisted into engagement with the wire 22 on being drawn taut with the valve head 14 in its open position so that the fusible wire 23 will serve to hold the valve element in its retracted position in opposition to the spring 19. The wires 22 and 23 constitute the fusible element D.

The spider E embodies a marginal annulus 25 which seats in a recess 26 on the outer end of the housing member 10; the outer margin of the annulus 25 conforming to the side wall of the recess 26 which extends concentric with the longitudinal axis of the valve housing. This arrangement serves to center the valve head 14 relative to the seat 13 when the annulus 25 is positioned in the recess 26. A gasket 27 is interposed between the annulus 25 and the contiguous end of the valve section 11 to seal the joint between the assembled sections 10 and 11.

In the operation of the form of the invention above described on fusing of the fusible element D as by a flash back through the entrant end 9 of a nozzle or burner, the valve B will be released and the valve head 14 thereof moved to its seated position on the valve seat C under the urge of the spring 19, thus cutting off the flow of gases to the chamber 7 from the supply pipe 8. Reconditioning of the valve for further operation is readily effected by separating the sections 10 and 11 of the valve housing, removing the valve assembly and replacing it with another or replacing the burned out fuse element D.

In the form of the invention shown in Figs. 4 and 5 the valve housing A is formed at the outlet end of the passage 7 thereof with a valve seat C and the valve element B in the form of a tapered head 29 on a stem 30 is arranged in operative relation to said seat; the valve stem 30 being slidable longitudinally in a sleeve 31 carried by the spider E interposed between the valve housing sections 10 and 11 in the manner described with reference to the construction shown in Figs. 1, 2 and 3. In this instance the valve element B is held in its retracted position in opposition to a spring 33 by a fusible wire 34 which extends astride the valve head 29 and has its ends secured to the spider E and constitutes the fusible element D. In the construction just described fusing of the element D will release the valve element B so that the head 29 thereof will be advanced against the seat C under the urge of the spring 33, thus cutting off the flow of gases through the valve housing from the supply pipe 8. As a means for confining frame to the forward end portion of the valve housing, particularly such as may be occasioned by burning of the wire 34, a fine meshed screen 35 is positioned to extend over the openings in the spider E. Reconditioning of the valve just described may be effected by replacing the valve element assembly including the spider E or by resetting the valve element B by replacing the burned out fuse element D.

In the form of the invention shown in Figs. 6 and 7 the valve housing is formed in the manner described with reference to the constructions shown in Figs. 1 and 4 and carries a spider E between the housing sections 10 and 11. In this instance the ends of the chamber 7 are provided with valve seats F and G and carried on the spider E is a pair of valve elements H and I, arranged for cooperation with the valve seats F and G. The valve element H is of the poppet type and comprises a head 36 on a stem 37 which extends through and is slidably supported in a hub 38 formed on the spider E. A coil spring 39 bears between the head 36 and hub 38 and urges the head toward the seat F. The valve element I is of the ball type and preferably comprises a resilient ball 40 which when assembled is seated on the end of the stem 37; the ball 40 being held in place on the stem in opposition to a spring 41, bearing between the ball 40 and the hub 38, by a fusible wire 42 which extends around the outermost portion of the ball and is engaged with the stem 37. As here shown the wire 42 is passed through an opening 43 in the portion of the stem 37 extending from the side of the spider E on which the valve element 36 is disposed; the end portions of the wire being led through the openings in the spider E and brought together around the ball 40 where the ends of the wire are twisted together. The opening 43 is located on the stem 37 within the length thereof normally covered by the spring 39 so that in initially effecting the assemblage the spring 39 is compressed and thereby placed under tension when passing the wire 42 through the opening 43 as indicated in Fig. 7. To complete the assemblage the stem is then retracted so that the spring 39 will abut the hub 38 or bear against the portion of the wire 42 extending across the adjacent end of the hub, whereupon the ball 40 is held against the contiguous end of the stem 37 which action compresses the spring 41; the ball being so held until the ends of the wire are connected so as to hold the ball in place. The assemblage thus formed is placed in the valve housing A in the manner set forth in connection with the construction shown in Figs. 1 and 4.

In the operation of the valve just above described, fusing of the wire 42 will effect release of the valves H and I so that the springs 39 and 41 will urge the valve elements 36 and 40 against their respective seats F and G, thereby closing the valve passage 7 at each end thereof.

As a means for facilitating ignition of the fusible element in each of the constructions shown a kindling leader 43 is formed on the fusible wire to project therefrom toward the outlet end of the valve housing where it will lie in the path of flash-back reaching or approaching the contiguous valve seat. The fusible element is formed of magnesium, thermite, or any other suitable material subject to being quickly fused on being subjected to the action of the flame of a flash-back.

By mounting the valve element with its fusible retaining element on a demountable spider the assembly may be readily mounted in the valve housing and removed therefrom so that replacement of a used of burned out element may be quickly effected thereby obviating replacement of the valve structure as a whole.

While we have shown and described specific embodiments of our invention we do not limit ourselves to the exact details of construction set forth, and the invention embraces such changes, modifications and equivalents of the parts and their formation and arrangement as come within the purview of the appended claims.

We claim:

1. In a fuse controlled valve, a valve housing having a passage leading therethrough with a valve seat at each end thereof, a spider in said valve housing, a spring pressed poppet valve carried by said spider including a stem reciprocably mounted an carried by said spider and extending therethrough, a ball valve adapted to be supported on the outer end of said valve stem, a spring for urging said ball valve away from said stem, and a fusible element connected to said valve stem and engaging said ball valve and holding the valve elements in an assembled position away from the valve seats in an open position with said spring under tension.

2. The structure called for in claim 1 in which the valve stem is formed with an opening through which the fusible element is passed arranged so that said element will form an abutment for one end of the poppet valve spring to initially hold it under compression.

3. In a fuse controlled valve, a valve housing having a passage leading therethrough with a valve seat at each end thereof, independently moveable valve elements in said passage, an apertured support element fixed within said passage and with which said valves are operatively associated, springs urging said valve elements toward said seats, and a fusible element connecting said valve elements and holding them away from said valve seats in an open position in opposition to said springs.

CARL A. NEWMAN.
RENI S. BERRY.

REFERENCES CITED

The following references are of record in the file of this patent:

UNITED STATES PATENTS

| Number | Name | Date |
|---|---|---|
| 466,022 | Rice | Dec. 29, 1891 |
| 1,005,677 | Werneat | Oct. 10, 1911 |
| 1,022,119 | Barton | Apr. 2, 1912 |
| 1,120,713 | Hennessy | Dec. 14, 1914 |
| 1,542,230 | Ganz | June 16, 1925 |
| 1,593,519 | Underwood | July 20, 1926 |